United States Patent
Kazmark, Jr.

[11] Patent Number: 5,414,895
[45] Date of Patent: May 16, 1995

[54] CART AND LUGGAGE HANDLE ASSEMBLY WITH A PUSH BUTTON ACTUATOR

[75] Inventor: Eugene A. Kazmark, Jr., Joliet, Ill.

[73] Assignee: Remin Laboratories, Inc., Joliet, Ill.

[21] Appl. No.: 139,454

[22] Filed: Oct. 20, 1993

Related U.S. Application Data

[63] Continuation-in-part of Ser. No. 67,552, May 26, 1993.

[51] Int. Cl.$^6$ .................................................. B25G 1/04
[52] U.S. Cl. ............................................................. 16/115
[58] Field of Search .............. 16/115, 110 R, 111 R, 16/111 A; 280/655.1, 655, 47.371, 47.17, 47.31, 47.24, 47.315

[56] References Cited

U.S. PATENT DOCUMENTS

| | | | |
|---|---|---|---|
| 3,572,870 | 3/1971 | Marks et al. | 312/244 |
| 3,702,016 | 11/1972 | Keesee | 16/111 |
| 3,998,476 | 12/1976 | Kazmark, Sr. | 280/655 |
| 4,284,287 | 8/1981 | Esposito | 280/47.37 |
| 4,354,689 | 10/1982 | Perego | 280/47.37 |
| 4,523,773 | 6/1985 | Holtz | 280/654 |
| 4,577,877 | 3/1986 | Kassai | 280/47.37 |
| 4,754,985 | 7/1988 | Im et al. | 280/40 |
| 4,896,897 | 1/1990 | Wilhelm | 280/655 |
| 4,974,871 | 12/1990 | Mao | 280/651 |
| 5,127,664 | 7/1992 | Cheng | 280/655 |
| 5,178,404 | 1/1993 | Chen | 280/655 |

*Primary Examiner*—P. Austin Bradley
*Assistant Examiner*—Chuck Y. Mah
*Attorney, Agent, or Firm*—Tilton, Fallon, Lungmus & Chestnut

[57] ABSTRACT

A handle assembly for carts and wheeled luggage includes a pair of tube assemblies disposed in substantially parallel relation and connected by a handle member. The handle assembly includes an actuating and latching apparatus for releasably locking the tube assemblies in an extended or retracted position.

9 Claims, 2 Drawing Sheets

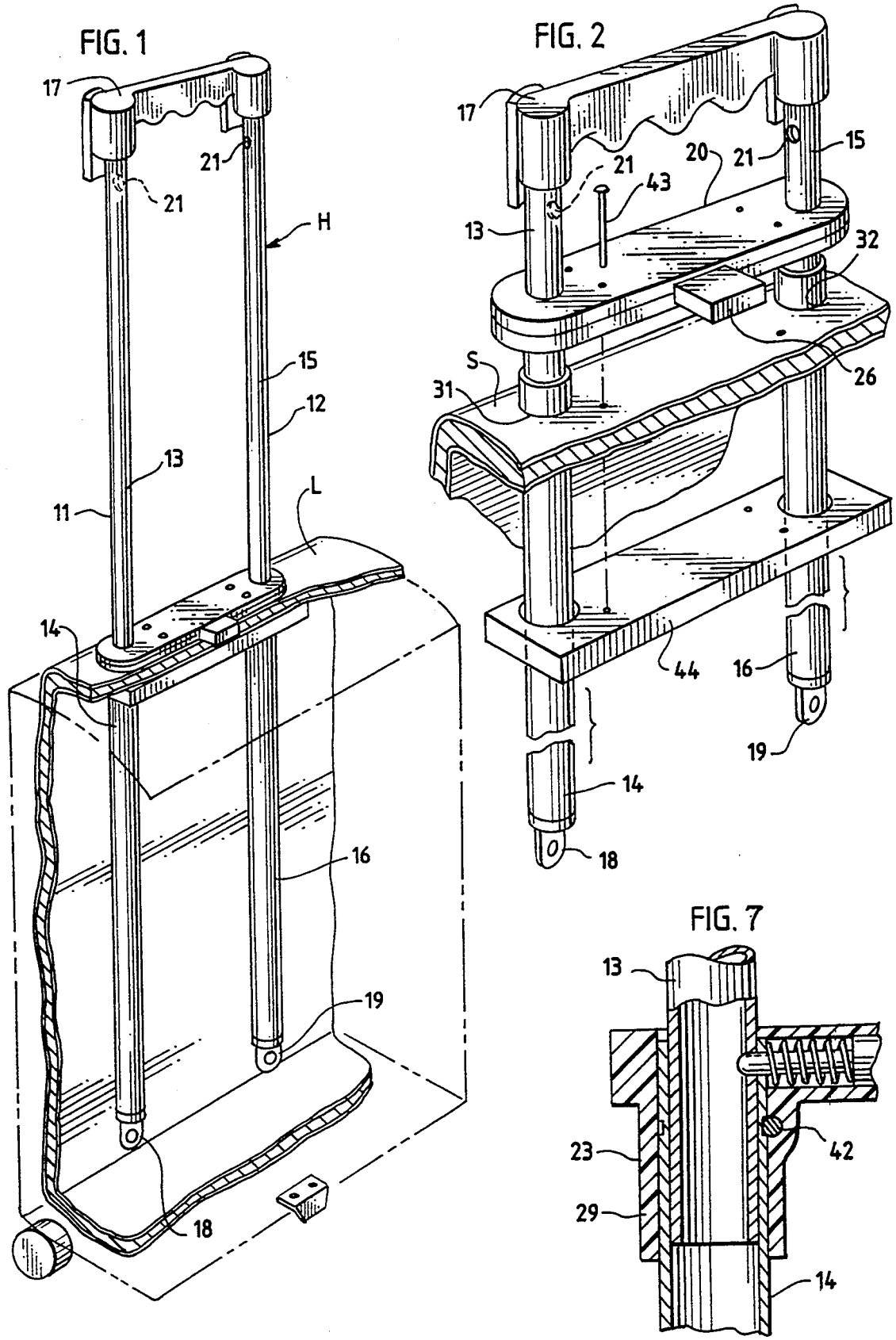

CART AND LUGGAGE HANDLE ASSEMBLY WITH A PUSH BUTTON ACTUATOR

This application is a continuation-in-part of application Ser. No. 067,552, filed May 26, 1993 for "Cart And Luggage Handle Assembly With An Actuator And Release Apparatus."

FIELD OF THE INVENTION

The present invention relates to a handle assembly for portable luggage carts or wheeled luggage and more particularly to a handle assembly which includes a pair of telescoping tube assemblies and an actuating and latching apparatus that releasably secures the tubes of the tube assemblies in an extended or retracted position.

DESCRIPTION OF THE PRIOR ART

The prior art includes a wide variety of luggage carriers or carts and wheeled luggage with telescoping and collapsible handle assemblies. The portable luggage carrier described in Kazmark, Sr. U.S. Pat. No. 3,998,476 includes a handle assembly comprising a pair of collapsible and telescoping tube assemblies. The lower ends of the intermediate and upper tubes carry lock buttons which extend through openings in the upper ends of the lower and intermediate tubes to releasably lock the tubes in an extended position. A pair of upper and lower release bars which extend between the tube assemblies adjacent the upper ends of the lower tubes release the lock buttons.

The release bars of the luggage carrier described above provide easy release of the lock buttons. However, this prior arrangement does not lend itself to installation in wheeled luggage. In addition, using the lock buttons makes the handle assembly complex.

The handle assembly of the present invention includes an actuating and latching apparatus which cooperates with openings in the assembly tubing to allow a user to place and lock the assembly in an extended or retracted position. The assembly is a simple construction which minimizes the expense of manufacture and assembly and provides quick and effective operation.

SUMMARY OF THE INVENTION

In accordance with one embodiment of the present invention, a handle assembly for wheeled carts or luggage includes at least one tube assembly with first and second tubes. The first tube extends into the second tube in telescoping relation with the second tube. Latching means disposed outwardly of the tubes extends through an opening in the first tube to lock the first tube in a predetermined position and prevent relative sliding movement between the first and second tube. Actuating means disposed a predetermined distance outwardly of the first and second tubes allows a user to release the latching means to allow sliding movement between the first and second tubes.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 1 is a perspective view of the handle assembly of the present invention secured to a piece of wheeled luggage with a portion of the luggage cut away to show the portion of the assembly disposed within the luggage;

FIG. 2 is a partial and exploded perspective view of the handle assembly shown in FIG. 1;

FIG. 7 is a sectional view showing an alternative connection between the actuating and latching apparatus and the tube assemblies.

Figure 3:
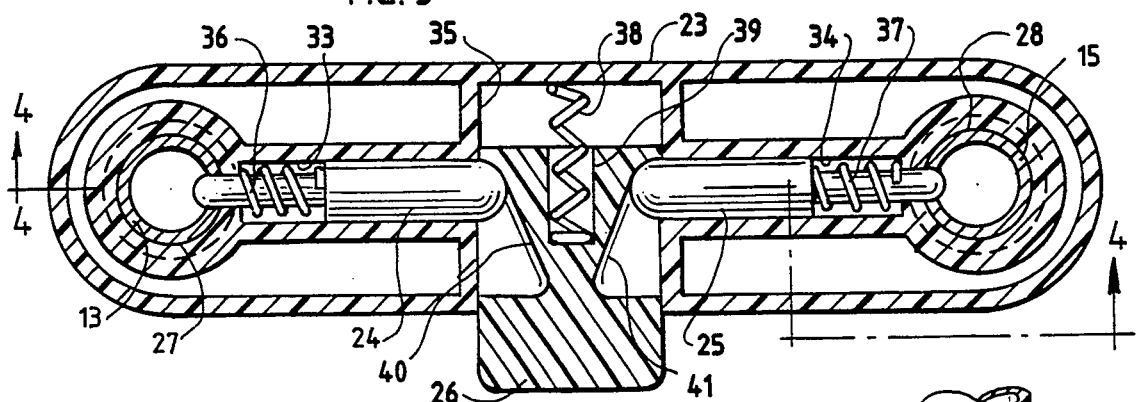
FIG. 3 is a horizontal sectional view taken along the center of the actuating and latching apparatus, showing a push button actuator in an extended position and a pair of latching rods extending into openings in the tubes of the handle assembly.

While the following disclosure describes the invention in connection with one embodiment and a modification one should understand that the invention is not limited to this embodiment. Furthermore, one should understand that the drawings are not to scale and that graphic symbols, diagrammatic representatives, and fragmentary views, in part, illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Turning now to the drawings, FIG. 1 shows the handle assembly H of the present invention secured to a piece of wheeled luggage L. The luggage L may be any one of a wide variety of commercially available products. In addition, although the handle assembly of the present invention finds particular utility in wheeled luggage, it may also serve as a handle assembly in two-wheeled carts or other similar devices.

The handle assembly H includes a pair of telescoping tube assemblies 11 and 12 disposed in parallel relation and secured to the bottom of the luggage L as shown in FIG. 1 and at the top of the luggage as shown in FIG. 2. The assembly 11 includes a first tube 13 and a second tube 14. The assembly 12 includes a third tube 15 and a fourth tube 16. The lower tubes 14 and 16 are round tubes; and the tube 14 has the same length and inside and outside diameter as the tube 16. The tubes 14 and 16 receive (in sliding, telescoping relation) the upper tubes 13 and 15 which are also round and which have an outside diameter smaller than the inside diameter of the tubes 14 and 16. The tube 13 has the same length, inside diameter, and outside diameter as the tube 15. (The tubes are made of aluminum, stainless steel or any other suitable material. In addition, although the embodiment shown includes round tubes, the tubes may have a square configuration, a generally rectangular configuration, or any other suitable cross-sectional configuration.)

A handle member 17 made out of hard plastic or any other material of high strength and rigidity lies fixedly secured to the top ends of the tubes 13 and 15. Alternatively, the tubes 13 and 15 and the handle 17 may be a one-piece, integrally formed unit. Tabs 18 and 19 lie fixedly secured to end portions of the tubes 14 and 16, respectively, and to the luggage L. These tabs 18 and 19 and handle member 17 prevent rotation of the upper tubes 13 and 15 and the lower tubes 14 and 16 to facilitate locking and unlocking the tube assemblies in predetermined positions as described below.

An actuating and latching apparatus 20, secured to the shell S of the luggage L and disposed between the tube assemblies 11 and 12 at the top ends of the tubes 14 and 16, cooperates with openings at the top and bottom ends of the tubes 13 and 15 to lock the tubes 13 and 15 and the handle 17 in an extended position shown in FIG. 1 and a retracted position (not shown) in which the handle 17 lies proximate the top of the shell S. (FIGS. 1 and 2 show the openings 21 at the top ends of the tubes 13 and 15. FIGS. 3–6 only show the opening 22 at the bottom ends of the tubes 13 and 15.) Alternatively, each of the tubes 13 and 15 may define more than two openings. They may include openings along their lengths to allow a user to lock the top portion of the handle assembly in a large number of positions.

The apparatus 20 generally includes a housing 23, a pair of spring loaded latching rods 24 and 25, and a spring loaded plunger 26. The housing 23 is made of plastic or any other material of sufficient strength and rigidity. It defines a bore 27 through which the tube assembly 11 extends and a bore 28 through which the tube assembly 12 extends. A sleeve portion 29 which lies circumjacent the bore 27 and a sleeve portion 30 which lies circumjacent the bore 28 are components of the housing 23; and they extend through openings in the shell S to line those openings through which the tube assemblies extend through the shell S. The tube assembly 11 extends through an opening 31; and the tube assembly 12 extends through an opening 32 of the shell S.

The housing 23 also defines a bore 33 which receives the latching rod 24 and a bore 34 which receives the latching rod 25. These bores 33 and 34 lie generally perpendicularly to the bores 27 and 28 and parallel to each other. They have a diameter D of predetermined magnitude, allowing sliding, reciprocating movement of the latching rods. At one end they communicate with a bore 35 which receives the plunger 26. At an opposite end, each of the bores 33 and 34 has a reduced diameter $D^1$ and communicates with either the bore 27 or the bore 28. The latching rods extend through the reduced diameter portions of the bores 33 and 34 and into the openings in the tubes 13 and 15 (as described below) to lock the handle assembly in predetermined positions.

Each rod 24 and 25 is an elongate member with rounded ends and with one portion having a first predetermined diameter and another portion having a diameter smaller than the first diameter. A spring 36 disposed around the reduced diameter portion of the rod 24 engages the other portion of the rod and the housing circumjacent the reduced diameter opening of the bore 33. It biases the rod 24 towards the plunger 26. A spring 37 disposed around the reduced diameter portion of the rod 25 engages the other portion of that rod and the housing circumjacent the reduced diameter opening of the bore 34. It biases the rod 25 towards the plunger 26.

Figure 5:
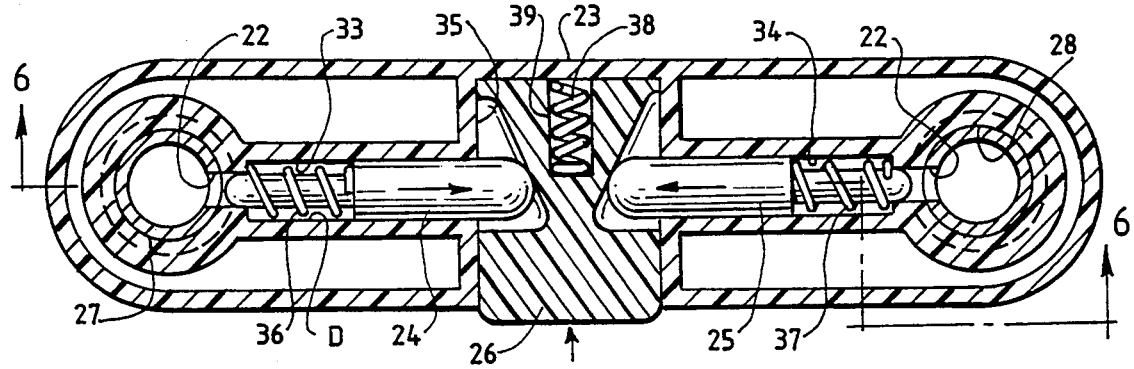
FIG. 5 is a sectional view of FIG. 3 showing the push button actuator in a depressed position.

As stated above, the opening 35 receives the plunger 26 in sliding relation so that a user may move the plunger 26 between the positions shown in FIGS. 3 and 5. A spring 38 disposed between an opening 39 of the plunger 26 and the back of the housing 23 biases the plunger 26 to the position shown in FIG. 3. A user may push the plunger 26 inwardly of the housing 23 overriding the force of the spring 38 and placing the plunger in the position shown in FIG. 5.

Figure 4:
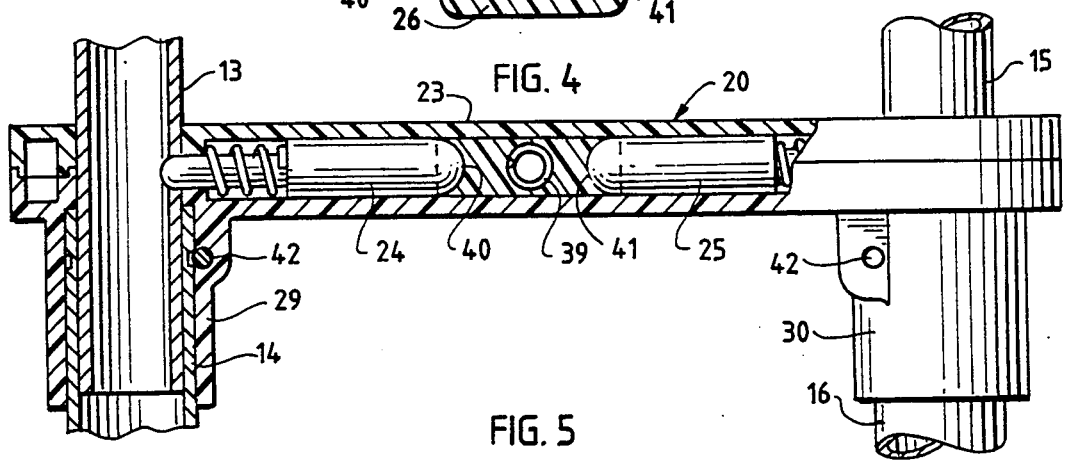
FIG. 4 is a sectional view taken along line 4—4 in FIG. 3.
Figure 6:
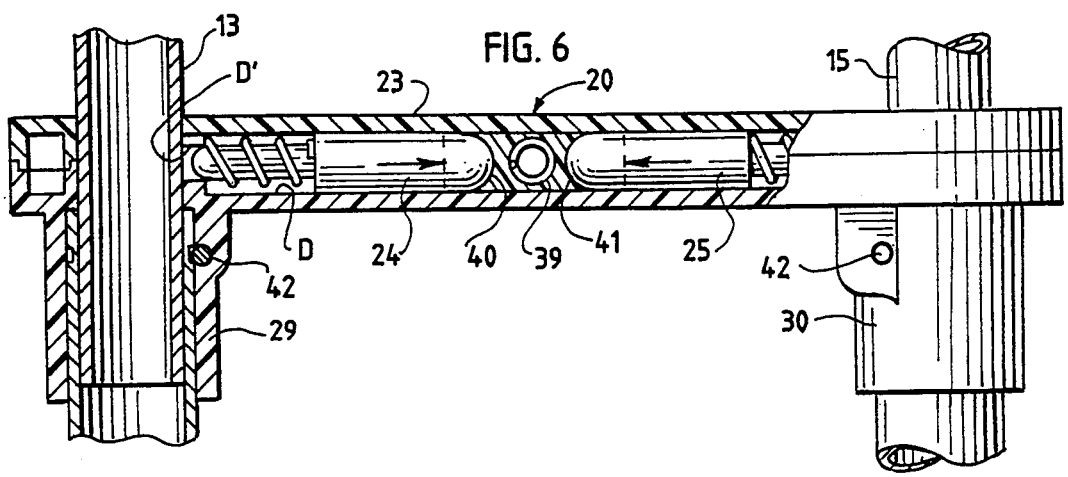
FIG. 6 is a sectional view taken along line 6—6 in FIG. 5.

During this reciprocating movement of the plunger 26, the rounded ends of the rods 24 and 25 slide along camming grooves 40 and 41, respectively. These grooves lie at an acute angle to the sides of the bore 35 which extends perpendicularly to the bores 33 and 34. They have a curved surface in cross-section as shown in FIGS. 4 and 6. Although the embodiment shown includes the grooves 40 and 41 in the plunger or push button 26, the plunger 26 may have flat surfaces where the rods make contact with it.

In operation, when the openings in the tubes 13 and 15 register with the bores 33 and 34, the reduced diameter ends of the latching rods 24 and 25 move into the tubes 13 and 15 and lock the handle assembly in a predetermined position. The force provided by the spring 38 is greater than the combined force of the springs 36 and 37. Accordingly, the latching rods 24 and 25 remain in the position shown in FIG. 3. If one pushes the plunger or button 26 inwardly of the housing 23 to the position shown in FIG. 5, the rods 24 and 25 slide towards the plunger 26 and out of the tubes 13 and 15, allowing the tubes 13 and 15 to slide relative to the tubes 14 and 16.

In the embodiment shown, the rods 24 and 25 extend into openings in the tubes 13 and 15. Alternatively, they may extend into openings in the tubes 14 and 16 as well as into openings in the tubes 13 and 15, as shown in FIG. 7. (In this modification, the bottom tubes 14 and 16 extend farther into the housing 23 and provide a secure connection between the apparatus 20 and the tube assemblies 11 and 12.) Bolts 42 which extend through the sleeve portions 29 and 30 and through grooves in the tubes 14 and 16 further secure the housing 23 to the tubes 14 and 16 (See FIGS. 4, 6 and 7). Finally, screws 43 cooperate with a locking plate 44 to secure the housing 23 to the shell S.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A handle assembly for wheeled carts or luggage, said assembly comprising:
    (a) first and second tubes, the first tube extending into the second tube in telescoping relation with the second tube, each of said first and second tubes defining at least one opening;
    (b) latching means disposed outwardly of the tubes for extending into at least one of the tubes through an opening in the tube to lock the first tube in a predetermined position relative to the second tube; and
    (c) actuating means disposed a predetermined distance outwardly of the first and second tubes for driving the latching means towards the tubes in a direction generally perpendicular to the longitudinal axes of the tubes into a locking position;
    (d) spring means for biasing the latching means outwardly of the tubes.

2. The assembly of claim 1, wherein the latching means lies generally perpendicularly to the first and second tubes and includes a portion which extends through an opening in the first tube to lock the two tubes together at predetermined positions of the tubes.

3. The assembly of claim 1, further comprising a housing member for supporting the actuating means and the latching means.

4. The assembly of claim 3, wherein the latching means includes an elongate rod disposed in sliding relation with the housing member.

5. The assembly of claim 4, wherein the actuating means includes a reciprocating plunger and a plunger spring for biasing the plunger to a predetermined position, the plunger having a camming surface and the latching means having a camming surface which cooperates with a camming surface on the plunger.

6. A handle assembly for wheeled carts or luggage, said assembly comprising:
 (a) a first tube assembly including first and second tubes, the first tube extending into the second tube in telescoping relation with the second tube;
 (b) a second tube assembly including third and fourth tubes, the third tube extending into the fourth tube in telescoping relation with the fourth tube;
 (c) said first and second tube assemblies disposed in substantially parallel relation;
 (d) latching means disposed between the first and second tube assemblies for locking one tube of each assembly relative to the other tube;
 (e) a housing member disposed between the first and second tube assemblies;
 (f) actuating means supported by the housing member a predetermined distance from the first tube assembly and a predetermined distance from the second tube assembly for driving the latching means towards the tubes in a direction generally perpendicular to the longitudinal axes of the tubes into a locking position; and
 (g) spring means for biasing the latching means outwardly of the tubes.

7. The handle assembly of claim 6, wherein the latching means includes an elongate rod member for each tube assembly, the rods extending through openings in the tubes of the tube assemblies to lock the tubes of each tube assembly together at predetermined positions.

8. The handle assembly of claim 7, wherein the elongate rods lies disposed on opposite sides of the actuating means in sliding relation with the housing member.

9. The handle assembly of claim 8, wherein the actuating means includes a reciprocating plunger and a plunger spring for biasing the plunger to a predetermined position, the plunger having a camming surface and the rods having a camming surface which cooperates with a camming surface on the plunger, the rods moving away from the tubes in response to movement of the plunger against the plunger spring.

* * * * *